United States Patent [19]

Thoden

[11] 3,843,053

[45] Oct. 22, 1974

[54] SPOTTER FOR USE IN THIN LAYER CHROMATOGRAPHY AND METHOD OF FORMING DROPS THEREWITH

[75] Inventor: John Thoden, Vineland, N.J.

[73] Assignee: Kontes Glass Company, Vineland, N.J.

[22] Filed: Mar. 29, 1973

[21] Appl. No.: 345,975

[52] U.S. Cl. ................ 239/11, 239/306, 239/424.5, 23/230 A, 23/253 A

[51] Int. Cl. ............................................ B05b 17/04

[58] Field of Search ............ 239/11, 273, 304, 306, 239/420, 424.5, 424, 549; 23/253 A, 230 A, 253 R, 230 R

[56] References Cited

UNITED STATES PATENTS

| | | | |
|---|---|---|---|
| 3,189,413 | 6/1965 | Davis | 23/253 R |
| 3,314,611 | 4/1967 | McCartney et al. | 239/424 |
| 3,463,404 | 8/1969 | Jennings | 239/11 X |
| 3,535,086 | 10/1970 | Baitsholts | 23/253 R |

*Primary Examiner*—M. Henson Wood, Jr.
*Assistant Examiner*—John J. Love

[57] ABSTRACT

A spotter for use in thin layer chromatography for automatically spotting a solution containing a specimen to be analyzed onto a thin layer chromatographic plate is provided having a plurality of storage tubes each of which stores a selected amount of a specimen-containing solution. In fluid communication with each of the storage tubes is a needle for forming a series of drops of the specimen-containing solution present within the storage tube. Means are provided for directing a flow of gas along the exterior of each of the needles in the direction of the drop movement therefrom. The gas flow affects the drops as they form and controls the rate at which the drops are formed by the needle. The flow of gas is then preferably directed from the needle towards the plate where the drops have fallen in order to speed formation of the spot by facilitating evaporation of the solvent from the drop of the specimen-containing solution.

14 Claims, 4 Drawing Figures

SPOTTER FOR USE IN THIN LAYER CHROMATOGRAPHY AND METHOD OF FORMING DROPS THEREWITH

This invention relates to a spotter for use in thin layer chromatography and more for use to a spotter in which the drop formation rate is regulated by controlling the flow of gas past the drop forming needle.

Thin layer chromatography is a chemical analytic technique whereby a chemical substance can be separated, identified, and quantitatively measured. This analytical technique is based on a physical property of chemical substances whereby different chemical substances in a mixture have different adsorption rates on a regular adsorbent material. The adsorbent material utilized is in the form of a thin, flat layer adhering to a support or base. The mixture to be analyzed is placed in the form of a spot on the adsorbent material. A solvent is then caused to continuously migrate over the spots. The migration of the solvent carries the substances present in the spot over certain distances on the adsorbent material, dependent upon the chemical makeup of the specimen. As the substances migrate along the adsorbent layer, the distance which each substance is carried is proportional to the partition coefficient of that substance. Subsequent to completion of the separation by means of the migration of the solvent, the spots are fixed in place on the adsorbent material by drying. After the spots are fixed, if they are not already visible they may be made visible by means of a developer. The developers can be ultraviolet light, radioactive materials, or chemicals sprayed on to the chromatographic area to induce coreaction with the substances.

The process of putting samples and standards on the thin layer of adsorbent material is called spotting. This has been accomplished in many ways, two of the most popular of which are to use volumetric capillaries with microliter capacities, or gas chromatographic syringes. However, these spotting techniques have proved unsatisfactory particularly when used in quantitative analysis. In order to obtain significant results with this process, the spots on the adsorbent material must be of relatively small diameter as well as containing a very high concentration of the specimen to be analyzed. For practical purposes, both of these requirements can usually be achieved by forming a solution of the specimen to be analyzed in an appropriate solvent. The solution is then formed into a drop by means of a needle and transferred to the adsorbent material. Because the specimen is in relatively dilute form, a relatively large quantity of solution must be deposited on the plate. This is done by means of a large number of small drops which are intermittently deposited on the same area on the adsorbent material. This process, although time consuming, prevents spreading as the drop is deposited on the plate and also achieves the desired high concentration of the specimen. Of course, the necessary time interval must be allowed between drops so that the solvent from the drops can evaporate. This process is continued until the deposited spot contains the appropriate concentration of the specimen to be analyzed. In this way a high concentration spot of small diameter is formed.

The spotting process must be accurately performed in order to achieve acceptable results. The drops must be placed precisely on the same area of the adsorbent material each time. Further, the drop formation rate must be accurately controlled in order to assure that the appropriate amount of solution will evaporate between the drops, thus minimizing spreading as the drop hits the adsorbent material.

Because of the accuracy and time necessitated by the spotting process, manual methods have given way to automatic spotting methods. Automatic spotting techniques have also become important because it is extremely desirable to be able to spot several specimens simultaneously on an adsorptive material. Further, it is also often necessary to spot a standard simultaneously with the specimens for comparison purposes. The amounts of solution deposited for each of the specimens and for the standard must be accurately controlled so that the concentration of the spots containing the specimens to be analyzed and the spot containing the standard are substantially equal. Different materials and different concentrations of material call for different drop formation rates, and it is most desirable that a given piece of laboratory apparatus be capable of varied rates of drop formation, and of accurate drop formation automatically and without requiring constant supervision, so that it can be used in a laboratory as an all-purpose piece of equipment.

It is therefore the prime object of the present invention to provide apparatus for automatically spotting a solution on an adsorbent material wherein the drop formation rate can be accurately controlled.

It is another object of the present invention to provide an automatic spotting apparatus for use in thin layer chromatography which performs the spotting application of several specimens simultaneously and accurately.

It is a further object of the present invention to provide an automatic spotter for use in thin layer chromatography which is inexpensive and reliable and which has no moving parts to jam, thus spoiling the specimen or the analysis.

It is still another object of the present invention to provide an automatic spotter foruse in thin layer chromatography which after the initial setup, requires no attention from an operator until the spotting procedure is completed.

In accordance with the present invention an automatic spotter for use in thin layer chromatography is provided for automatically spotting one or more solutions containing specimens to be analyzed on a thin chromatographic plate. The spotter comprises a rack into which a plurality of tubes each of which contains a selected amount of a specimen-containing solution are situated. The rack is mounted over a base upon which the thin layer chromatographic plate is located. The thin layer chromatographic plate can be comprised of a sheet of paper or glass which acts as a support upon which a thin layer of adsorbent material is coated. Precoated plates of this type are commercially available and exhibit excellent uniformity and abrasive resistance. Each of the tubes has a means for forming a series of drops in fluid communication with it. The drop forming means is preferably in the form of a hollow hypodermic type needle having a tapered end. Means external to the drop means is placed adjacent each of the needles for directing a flow of the gas closely past the exterior of the needles in the direction of the drop movement therefrom. The gas used can be any gas which is chemically inert such that any reaction between the specimen-containing solution and the gas is prevented. Either oxygen or nitrogen has proved adequate in this regard. The flow of gas past the needle causes the gas to affect the drops as they are formed. The rate at which the drops are formed by the needle is dependent, within limits, upon the flow of gas past the drop means. Since the flow rate of the gas can be easily and accurately controlled, the gas flow is utilized to control formation rate of the spotter.

After the gas flows past the needle it is preferably directed towards the thin layer chromatographic plate in order to facilitate the evaporation of the solvent from the drops on the plate. After the initial setup of the apparatus, the spotter needs no further attention from the operator and will continue to place the drops on the plate at a rate determined by the gas flow until the solutions in the tubes are entirely deposited. At this point the operator will turn off the gas and remove the plate for further processing.

To the accomplishment of the above, and to such other objects as may hereinafter appear, the present invention relates to a spotter for use in thin layer chromatography and to the method of using same as defined in the appended claims and as described in this specification, taken together with the accompanying drawings in which like numerals refer to like parts and wherein:

The spotter of the present invention comprises a support, generally designated A, upon which the chromatographic plate will rest. Mounted above support A is a rack or holder, generally designated B, for holding a plurality of tubes C in which the specimen-containing solution is stored. A gas manifold, generally designated D, directs gas along the needles which are in fluid communication with each of the tubes C. The gas affects the drops as they are formed by the needles, thus controlling the drop formation rate.

Figure 1:
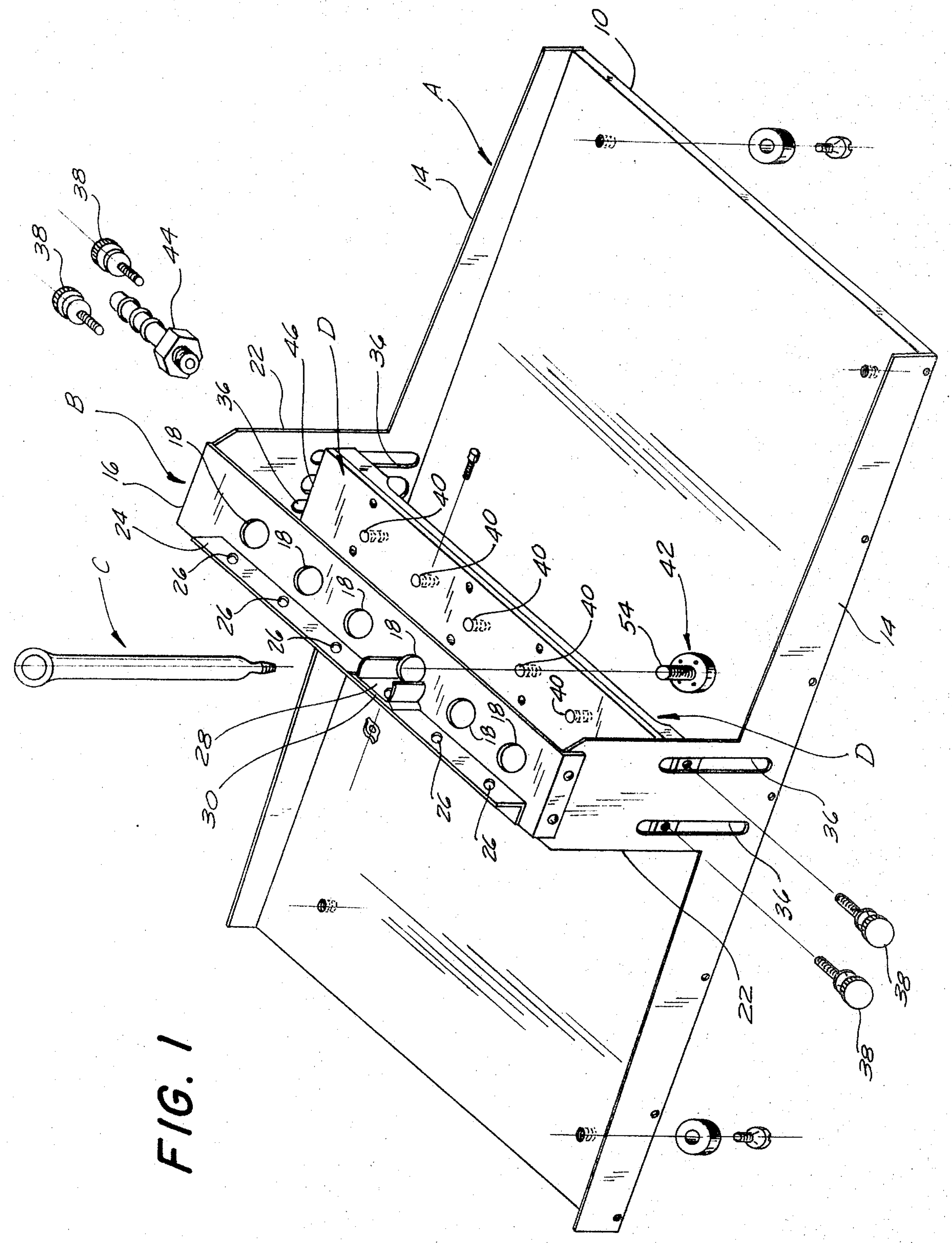
FIG. 1 is an isometric, partially exploded view of the preferred embodiment of the spotter.
Figures 3, 4:
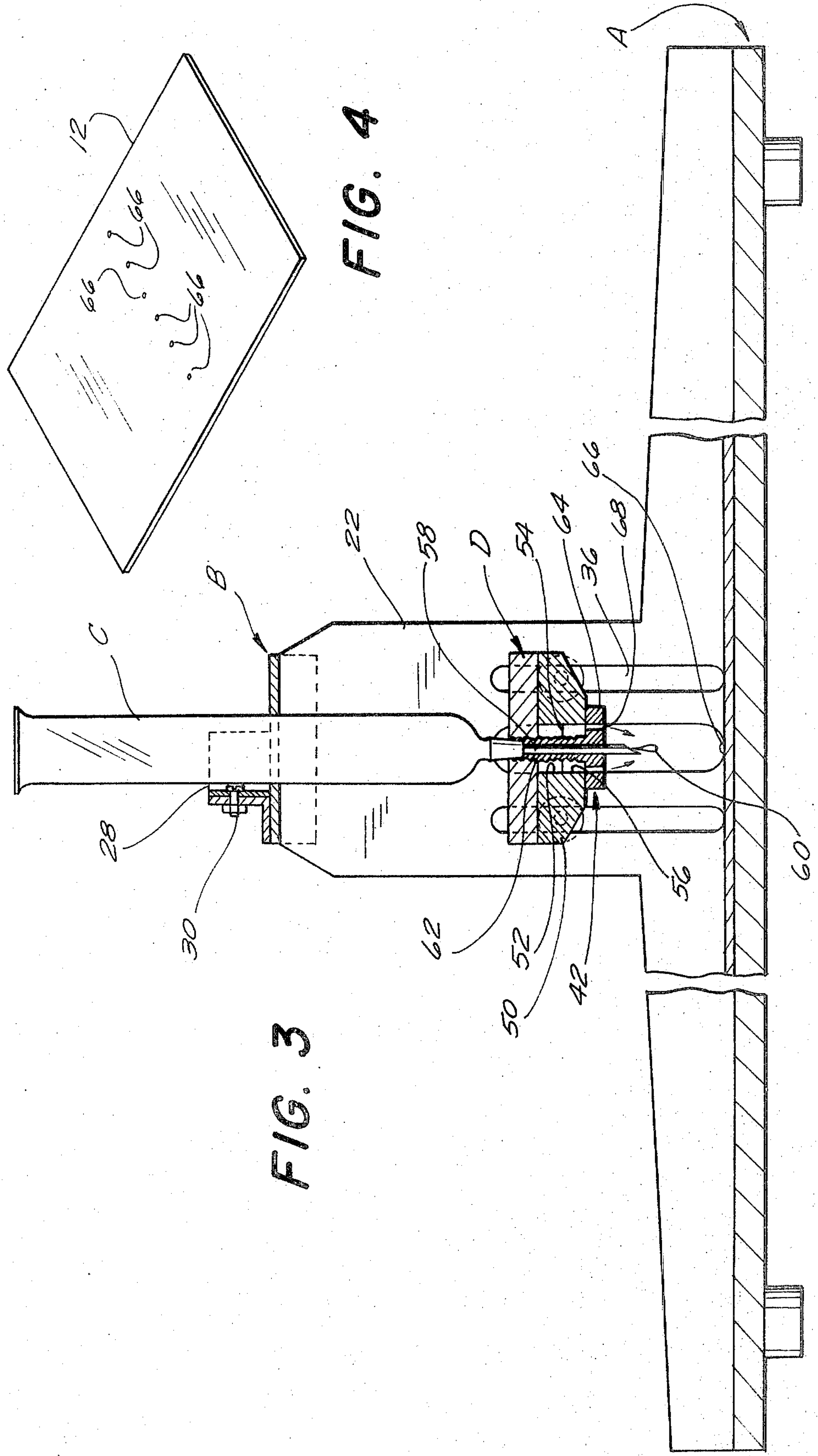
FIG. 3 is a cross-sectional side view of the preferred embodiment.
FIG. 4 is an isometric view of the thin layer chromatographic plate after the spots have been placed thereon.

The automatic spotter of the present invention, as shown in FIG. 1, comprises a support A having a base 10 which acts as a support for a thin layer chromatographic plate 12. Plate 12 is composed of a thin layer, usually having a thickness in the order of microns, of an adsorbent material coated on a paper or glass support. One such plate is shown in FIG. 4. The plate 12 is retained between the side walls 14 of the base 10 underneath the tube holding rack or holder B. The tube holding rack B comprises a horizontal plate 16 having a plurality of apertures 18 therein. Each aperture 18 has a diameter large enough to accept a tube C into which the solution containing the specimen to be analyzed is placed. Preferably six apertures 18 are provided, each of which can accept a tube C. Only one tube is shown in the drawing for convenience. The horizontal plate 16 of rack B rests on two vertical members 22, each of which extends from a different one of the side walls 14. A plate 24 is mounted perpendicular to the surface of plate 16. Plate 24 has a plurality of apertures 26 therein, each of which is adjacent to one of the apertures 18 in the plate 16. A tube holder 28 is affixed adjacent each aperture 18 by means of a fastener 30 mounted thereon which fits into aperture 26 to affix the tube holder 28 to plate 24. Tube C which contains the solution to be spotted, will be inserted into holder 28 where it will be resiliently grasped and retained in position (see FIG. 3).

A gas manifold generally designated as D is situated between rack 16 and base 10. Manifold D is removably affixed to vertical members 22. Slots 36 formed in each vertical member 22 are shaped to permit screws 38 to pass through them and into the threaded apertures in gas manifold D. Slots 36 are elongated such that the vertical spacing of the gas manifold with respect to the plate 11 can be adjusted by loosening the screws and manually moving the manifold D to the desired position. Gas manifold D has a plurality of apertures 40 on the top surface thereof, the centers of which are aligned with the centers of apertures 18 of plate 16. Each of these apertures 40 is internally threaded to permit a nozzle 42 to be screwed therein such that a gas-tight seal is formed between the aperture 40 and the neck of nozzle 42. A gas inlet member 44 is inserted through slot 46 in one of the vertical members 22 to provide a gas entrance into manifold D from a gas source (not shown).

Figure 2:
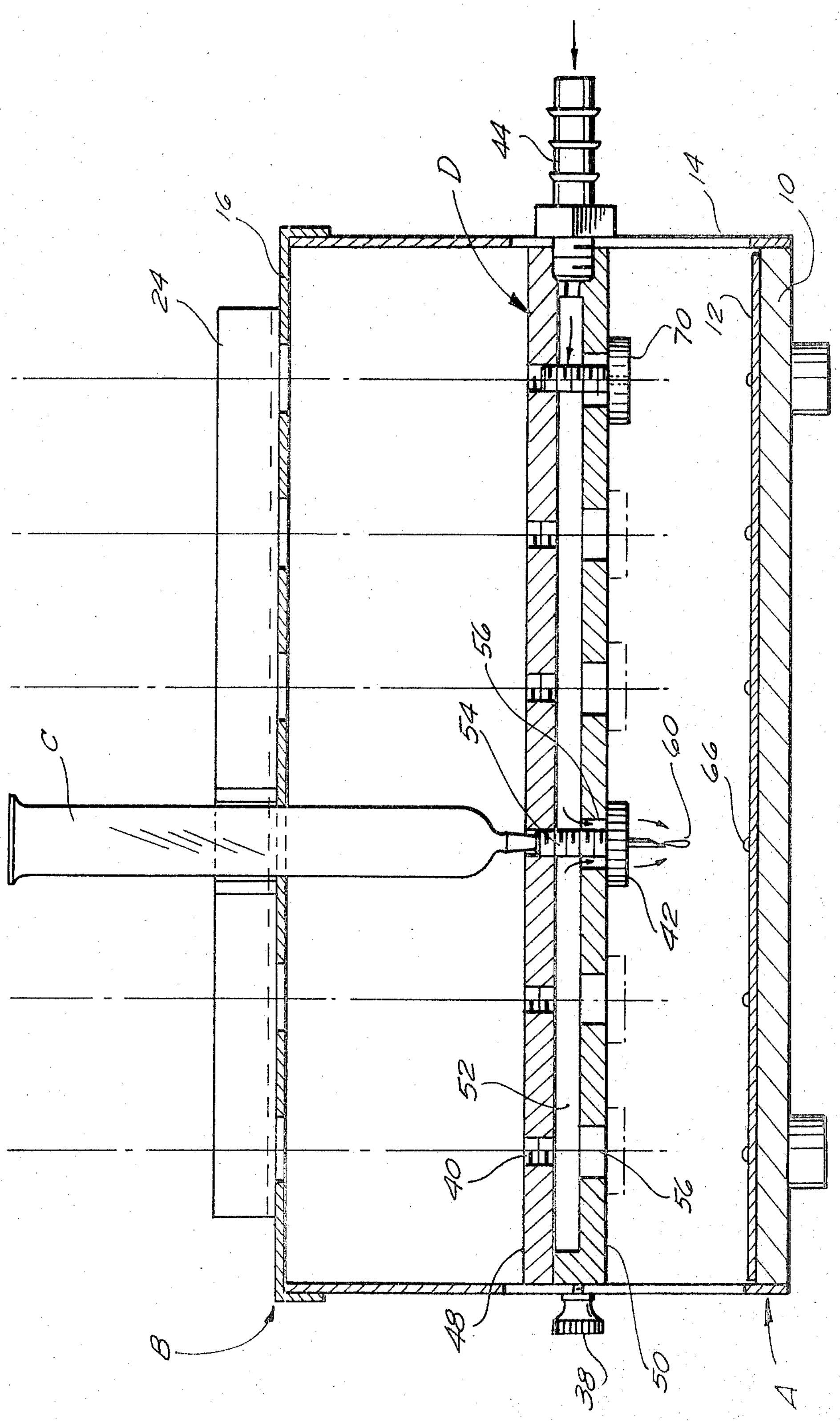
FIG. 2 is a cross-sectional elevational view of the preferred embodiment of the spotter.

As shown in FIG. 2, gas manifold D comprises an upper section 48 and a lower section 50. At least one of these sections (as here shown, the section 50), has an internal groove which runs along the length of the manifold to form a gas channel 52. The gas channel 52 is in fluid communication with inlet means 44 such that the gas which enters through inlet means 44 travels along the length of the manifold through channel 52. The apertures 40 which are situated along the top section 48 of the gas manifold D have a diameter which is roughly equivalent to the diameter of the neck portion 54 of the nozzle 42. Therefore, when the nozzle 42 is inserted into aperture 40, a gas-tight seal is formed between the upper section 48 of the manifold and the neck 54 of the nozzle to prevent any gas leakage. The lower section 50 of manifold D has a plurality of apertures 56 therein which are aligned with apertures 40 on the top section 48. However, apertures 56 are somewhat larger in diameter than apertures 40 for reasons which will become apparent.

Referring now to FIG. 3, Tube C has an aperture on the bottom portion thereof through which a needle 58 extends. Needle 58 is preferably of the hypodermic type which has a hollow passage to permit a limited amount of solution to pass therethrough. Normally the tip of needle 58 is tapered. A drop 60 is formed at the tip of needle 58. The needle is inserted through a passage 62 which extends through nozzle 42, including the neck 54 thereof.

Head portion 64 of nozzle 42 has a plurality of gas channels 68 situated adjacent but radially outside channel 62. The aperture 56 in the bottom portion 50 of manifold D is wide enough to permit fluid communication between the channels 68 in nozzle 42 and channel 52 in manifold D. The gas which is in channel 52 of manifold D exits from the manifold through apertures 56 and enters channels 68. This is the reason for the relatively large diameter of apertures 56. The gas then passes from channels 64 and is directed downwardly closely past the outside of needle 58. As the gas travels past the tip of needle 58 a venturi-type action is created such that the fluid inside needle 58 is sucked out of the end of the needle in order to form a drop. When the mass of the drop overcomes the adhesion of the drop to the needle, the drop will fall to the thin layer chromatographic plate 12 which is situated below the needle and form a spot 66 thereon. The plate will look like FIG. 4 after spots 66 have been deposited.

The gas, after it passes the tip of the needle, is directed towards the thin layer chromatographic plate 12 where it passes over the spot 66 thus facilitating evaporation of the solution from drop 66. This facilitation of evaporation speeds up the spotting process.

The drop formation rate can be regulated in one of two ways. The manifold D can be raised or lowered with respect to needle 58 by the loosening of screws 38 which will permit the manifold to move up or down along slot 36. When the desired position is attained, screws 38 are tightened to retain the manifold at that position. This serves to adjust the percentage of gas flowing through channels 56 which is actually passing the tip of needle 58. The drop formation rate can also be regulated by controlling the amount of gas which flows through intake 44 and therefore past the needle. This is generally accomplished by a valve (not shown) situated on the gas source itself and by means of a gas flow meter situated in conjunction with the valve. The amount of gas flowing into manifold D can be easily adjusted and accurately controlled. Since the drop formation rate is dependent upon the gas flow past the tip of the needle, it is desirable to be able to accurately control the gas entering intake 44 as well as the position of manifold D with respect to the needle.

The optimum gas flow, and therefore the drop formation rate, for each particular application of the spotter will depend upon the solvent used in the specimen-containing fluid. If the solvent is easily evaporated, it will be desirable to have a high drop formation rate. On the other hand, if the solvent does not quickly evaporate, it is necessary to have a slower drop formation rate. In any case, the drop formation rate can be accurately controlled, within limits, by the accurate controlling of the gas flow rate past the needle tip.

The drawings have illustrated the use of only a single tube in conjunction with the spotter. Obviously, up to six solutions can be spotted simultaneously in the preferred embodiment of the spotter. However, there is really no limit to the number of simultaneous spotting operations which can be performed if appropriate structural modifications are made. The drawings are only meant to be illustrative. In the event that one or more of the stations is not in use during the spotting operation, a nozzle 70 is inserted into manifold D instead of nozzle 42 (see FIG. 2). Nozzle 70 has no channels 68 therein, and therefore prevents gas from escaping from the manifold through the unused apertures 56.

A preferred embodiment of the present invention has been specifically disclosed herein for purposes of illustration. It is apparent that many variations and modifications may be made upon the specific structure disclosed herein. It is intended to cover all of these variations and modifications which fall within the scope of this invention as defined by the appended claims.

I claim:

1. A spotter for use in thin layer chromatography for automatically spotting a solution containing a specimen to be analyzed onto a thin layer chromatographic plate comprising means for storing a selected amount of specimen-containing solution, means for forming a series of drops of the specimen-containing solution, said drop means being in fluid communication with said storage means and means external of said drop means for directing a flow of gas closely past the exterior of said drop means in the direction of drop movement therefrom, thereby causing said gas to affect said drops as they form, the rate at which the drops are formed by the drop means thus being dependent on the flow of said gas.

2. The spotter according to claim 1 wherein said gas is directed towards the area on the plate where a drop has fallen to increase the rate of evaporation of the solution from said fallen drop.

3. The spotter according to claim 1 wherein said gas flow means comprises a gas source, and a gas nozzle operably connected to said source, said nozzle having passage therethrough directed toward said drop means for directing said gas past said drop means.

4. The spotter according to claim 3 wherein said drop means is a needle and wherein said nozzle has a channel therein through which said needle extends.

5. The spotter according to claim 1 further comprising means for regulating the flow of gas past said drop means.

6. The spotter according to claim 1 further comprising means for adjusting the relative position of said gas flow means with respect to said drop means.

7. The spotter according to claim 4 further comprising means for adjusting the relative position of said nozzle with respect to said needle.

8. A spotter for use in thin layer chromatography for automatically spotting a solution containing a specimen to be analyzed comprising a base, a tube for storing the specimen-containing solution, a tube-holding platform situated above said base, means for mounting said tube on said platform, a needle for forming a drop of said specimen-containing solution, said needle being operably connected to and in fluid communication with said tube, and means for directing a flow of gas closely past said needle in the direction of drop movement therefrom, thereby causing said gas to affect said drops as they form, the rate at which the drops are formed by said needle thus being dependent on the flow of gas.

9. The spotter according to claim 8 wherein a plurality of tubes each of which having a different one of a plurality of needles operably connected therewith is provided to create a plurality of drops on said plate and wherein said gas flow means comprises a gas manifold having a gas containing channel therein and a plurality of apertures, a different one of said apertures adjacent each of said needles, each of said apertures being in fluid communication with said channel such that said gas is directed through said aperture and past said needle.

10. The spotter according to claim 9 wherein said manifold is situated between said platform and said base and comprises a top and a bottom section, said sections being formed to provide an interior channel along the length thereof, and a gas source, said source being operably connected to said channel.

11. The spotter according to claim 8 wherein said gas flow means comprises a nozzle, said nozzle having a channel therethrough through which said needle extends, and a gas manifold having a gas containing channel therein, and an aperture aligned with said needle, said nozzle being inserted into said aperture, and having a passage therethrough operably connected to said manifold channel for directing said gas through said nozzle and past said needle.

12. The spotter according to claim 11 further comprising means for adjusting the position of the manifold with respect to said needle.

13. A method for controlling the drop formation rate in a spotter for use in thin layer chromatography of the type having a storage tube for storing a solution containing the specimen to be analyzed and a needle in fluid communication therewith for forming the drops comprising the steps of flowing a gas closely past the end of the needle in the direction of drop movement therefrom thereby causing said gas to affect said drops as they form to control the drop formation rate and regulating the gas flow in accordance with the desired drop rate.

14. The method according to claim 13 further comprising the step of directing the gas flow over the spot to increase the evaporation rate of the solvent.

* * * * *